(12) United States Patent
Yoshizawa et al.

(10) Patent No.: US 12,267,033 B2
(45) Date of Patent: Apr. 1, 2025

(54) MOTOR DRIVE SYSTEM

(71) Applicant: SUBARU CORPORATION, Tokyo (JP)

(72) Inventors: Satoshi Yoshizawa, Tokyo (JP); Tomoyuki Okada, Tokyo (JP)

(73) Assignee: Subaru Corporation, Tokyo (JP)

( * ) Notice: Subject to any disclaimer, the term of this patent is extended or adjusted under 35 U.S.C. 154(b) by 157 days.

(21) Appl. No.: 18/088,932

(22) Filed: Dec. 27, 2022

(65) Prior Publication Data
US 2023/0223884 A1 Jul. 13, 2023

(30) Foreign Application Priority Data

Jan. 12, 2022 (JP) ................................. 2022-002868

(51) Int. Cl.
*H02P 27/08* (2006.01)
*B60L 7/10* (2006.01)
(Continued)

(52) U.S. Cl.
CPC ................ *H02P 27/08* (2013.01); *B60L 7/10* (2013.01); *B60L 50/60* (2019.02); *B60L 53/24* (2019.02);
(Continued)

(58) Field of Classification Search
CPC ........ H02P 27/08; H02P 3/14; H02P 2201/07; H02P 3/18; H02P 25/22; H02P 5/74; H02P 27/06; B60L 7/10; B60L 50/60; B60L 53/24; B60L 2210/30; B60L 2210/42; B60L 15/2045; B60L 7/16; B60L 2210/12; B60L 2210/14; B60L 2220/42; B60L 2220/54; B60L 15/007; H02K 16/04; H02K 1/2796;
(Continued)

(56) References Cited

U.S. PATENT DOCUMENTS 7,990,098 B2 * 8/2011 Perisic .................... B60L 50/61
363/55
9,748,887 B2 * 8/2017 Notohara ................. B60L 7/14
(Continued)

FOREIGN PATENT DOCUMENTS

JP          2009-27870 A      2/2009
JP          2016-131444 A     7/2016

*Primary Examiner* — David Luo
(74) *Attorney, Agent, or Firm* — Troutman Pepper Locke LLP

(57) ABSTRACT

A motor drive system includes a battery, double-stator axial gap motors, inverter circuits configured to control power running drive and regenerative drive of the double-stator axial gap motors, step-up/step-down circuits configured to adjust at least voltage of regeneratively generated power of the double-stator axial gap motors, and one or more control devices configured to control drive of the inverter circuits and the step-up/step-down circuits. Each of the double-stator axial gap motors includes two stators. Each of the inverter circuits are connected to a respective one of the two stators. The inverter circuits are connected in series. A single step-up/step-down circuit among the step-up/step-down circuit is provided for each of the axial gap motors. The single step-up/step-down circuit provided for each of the axial gap motors is connected to one of two inverter circuits connected to the two stators among the inverter circuits.

3 Claims, 5 Drawing Sheets

(51) Int. Cl.
    *B60L 50/60*         (2019.01)
    *B60L 53/24*         (2019.01)
    *H02K 16/04*        (2006.01)
    *H02P 3/14*          (2006.01)

(52) U.S. Cl.
    CPC ............... *H02K 16/04* (2013.01); *H02P 3/14* (2013.01); *B60L 2210/30* (2013.01); *B60L 2210/42* (2013.01)

(58) Field of Classification Search
    CPC .. H02M 1/0025; H02M 1/0048; H02M 1/007; H02M 1/0074; H02M 1/008; H02M 3/158; H02M 7/53871; H02M 7/797; H02M 1/088; H02M 5/293; Y02T 10/70; B60K 6/26; B60K 2006/266; B60W 20/14
    USPC ........ 318/139, 801, 800, 799, 798, 767, 727
    See application file for complete search history.

(56)                 References Cited

U.S. PATENT DOCUMENTS 9,985,566 B2 *   5/2018   Jiang .................... H02M 7/493
2016/0204728 A1     7/2016   Notohara et al.

\* cited by examiner

MOTOR DRIVE SYSTEM

CROSS-REFERENCE TO RELATED APPLICATION

The present application claims priority from Japanese Patent Application No. 2022-002868 filed on Jan. 12, 2022, the entire contents of which are hereby incorporated by reference.

FIELD OF THE INVENTION

The disclosure relates to a motor drive system.

BACKGROUND

A hybrid electric vehicle and an electric vehicle with no internal combustion engine aboard (hereinafter collectively referred to as "electric vehicles") include a drive motor configured to output driving force of the vehicle. The drive motor is also used as a regenerative brake in deceleration of the vehicle, and performs power generation by utilizing rotational torque of wheels (hereinafter also referred to as "regenerative power generation"). A battery is charged with power resulting from the regenerative power generation (regeneratively generated power). An electric vehicle put to practical use so far includes a single drive motor, and drive of this drive motor is controlled by a single inverter (see, for example, Japanese Unexamined Patent Application Publication (JP-A) No. 2009-027870).

Recently, a progress has been made in putting an electric vehicle including plural drive motors into practical use. Examples include an electric vehicle with a front-wheel drive motor and a rear-wheel drive motor, and an electric vehicle with a drive motor corresponding to each wheel. Moreover, a research has been made on an electric vehicle where a double-stator axial gap motor including two stators is used as a drive motor (see, for example, JP-A No. 2016-131444). In such an electric vehicle, inverters configured to drive the drive motors or the stators are in parallel connection to a battery.

SUMMARY

An aspect of the disclosure provides a motor drive system. The motor drive system includes a battery, double-stator axial gap motors, inverter circuits, step-up/step-down circuits, and one or more control devices. The inverter circuits are configured to control power running drive and regenerative drive of the double-stator axial gap motors. The step-up/step-down circuits are configured to adjust at least voltage of regeneratively generated power of the double-stator axial gap motors. The one or more control devices are configured to control drive of the inverter circuits and the step-up/step-down circuits. Each of the double-stator axial gap motors includes two stators. Each of the inverter circuits is connected to a respective one of the two stators of each of the axial gap motors. The inverter circuits are connected in series. A single step-up/step-down circuit among the step-up/step-down circuits is provided for each of the axial gap motors. The single step-up/step-down circuit provided for each of the axial gap motors is connected to one of two inverter circuits connected to the two stators among the inverter circuits.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
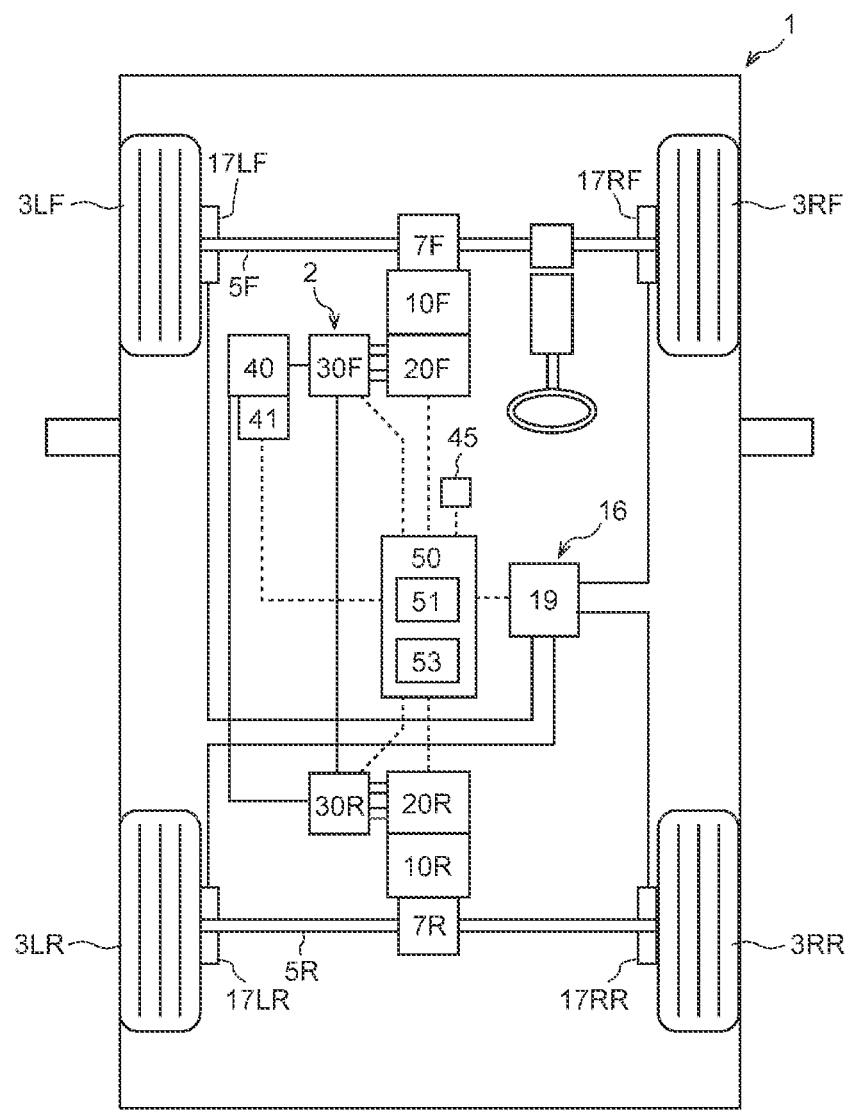
FIG. 1 is a schematic diagram illustrating a configuration example of a vehicle where a motor drive system according to an embodiment of the disclosure is applicable.

It is known that when a drive motor is used as a regenerative brake, a voltage of regeneratively generated power (hereinafter also referred to as "regenerative power voltage") output from an inverter is proportional to a rotational speed of the drive motor. Consequently, when a vehicle decelerates during low-speed or medium-speed travel, the regenerative power voltage may be insufficient for a charging voltage of a battery. Actually, deceleration of the vehicle is more frequent during low-speed or medium-speed travel than during high-speed travel. In view of this, there is a technique of providing a step-up/step-down circuit between the inverter and the battery. When the regenerative power voltage and the charging voltage of the battery have a large difference, a current of regeneratively generated power (hereinafter also referred to as "regenerative power current") output from the inverter at a lower voltage side is to be increased. When the regenerative power current is increased to raise the regenerative power voltage to the charging voltage of the battery, the number of times of driving a switching element provided in the inverter is increased. This may result in an increased energy loss by heat, which may decrease regenerative power efficiency.

To address this possibility, when two inverters are connected to each of the two stators of a double-stator axial gap motor, the inverters are connected in series so that the regenerative power voltage can be raised. At this time, regenerative power currents output from the inverters are to be equal to each other. In the case of the double-stator axial gap motor, balance between regenerative torques of the two stators is adjusted to make the regenerative power currents output from the inverters equal to each other while a sum of the regenerative power currents is kept constant.

However, when two or more double-stator axial gap motors are provided, for example, when an independent double-stator axial gap motor is provided for each of a pair of front wheels and a pair of rear wheels, regenerative torques (requested brake torques) of the motors are different in many cases. Therefore, even with the regenerative power currents of each of the motors being made equal to each other when the inverters are connected in series, regenerative power currents of all of the inverters are not to be made equal to one another. Unless the regenerative power currents are equal to one another, for example, the regenerative power currents of all of the inverters are made equal to a minimum regenerative power current of one of the motors, and a braking torque (regenerative torque) equivalent to a surplus current amount is compensated with a friction brake and released as thermal energy. This decreases regenerative power efficiency.

It is desirable to provide a motor drive system that includes double-stator axial gap motors connected in series, and that makes it possible to prevent regenerative power efficiency from decreasing when adjusting regenerative power voltages and charging a battery.

Hereinafter, embodiments of the disclosure will be described in detail with reference to the accompanying drawings. In the specification and the drawings, elements having substantially the same functional configurations are denoted by the same reference signs to omit repeated descriptions thereon.

First, a description will be given on an example of general arrangement of a vehicle where a motor drive system according to an embodiment of the disclosure is applied. The motor drive system according to the embodiment includes a front-wheel drive motor configured to drive front wheels and a rear-wheel drive motor configured to drive rear wheels. As the drive motors, double-stator axial gap motors are employed.

FIG. 1 is a schematic diagram illustrating a configuration example of a vehicle 1 where a motor drive system 2 according to the embodiment is applied. The vehicle 1 illustrated in FIG. 1 is a four-wheel drive electric vehicle including a left front wheel 3LF, a right front wheel 3RF, a left rear wheel 3LR, and a right rear wheel 3RR (hereinafter generally referred to as "wheels 3" unless specified otherwise). In this vehicle 1, drive torque output from a front-wheel drive motor 10F as a driving force source configured to generate drive torque of the vehicle 1 is transmitted to the left front wheel 3LF and the right front wheel 3RF (hereinafter generally referred to as "front wheels 3F" unless specified otherwise), and drive torque output from a rear-wheel drive motor 10R is transmitted to the left rear wheel 3LR and the right rear wheel 3RR.

The vehicle 1 includes the motor drive system 2 and a hydraulic brake system 16. The hydraulic brake system 16 includes brake devices 17LF, 17RF, 17LR, and 17RR (hereinafter collectively referred to as "brake devices 17") provided for the respective wheels 3, and a brake hydraulic pressure control device 19 configured to control a hydraulic pressure supplied to each of the brake devices 17. The brake device 17 is configured to apply a braking force to the corresponding wheel 3 by utilizing the hydraulic pressure supplied to cause brake pads to hold a brake disk rotating with the wheel 3, for example. The brake hydraulic pressure control device 19 includes an electric motor pump configured to discharge brake fluid, electromagnetic valves configured to regulate a hydraulic pressure supplied to each of the brake devices 17, and a brake controller configured to control drive of the electric motor pump and the electromagnetic valves. The hydraulic brake system 16 controls the hydraulic pressure supplied to each of the brake devices 17 so as to generate a predetermined braking force for each of the front and rear, left and right drive wheels 3LF, 3RF, 3LR, and 3RR. The hydraulic brake system 16 and the regenerative brake utilizing the front-wheel drive motor 10F and the rear-wheel drive motor 10R are both used.

The motor drive system 2 includes the front-wheel drive motor 10F, a front-wheel inverter unit 20F, a front-wheel converter unit 30F, the rear-wheel drive motor 10R, a rear-wheel inverter unit 20R, a rear-wheel converter unit 30R, a battery 40, and a control device 50. A configuration example of the motor drive system 2 will be described in detail later.

The vehicle 1 includes a vehicle state sensor 45. The vehicle state sensor 45 is coupled to the control device 50 via an exclusive-use line or a communication system such as controller area network (CAN) or local internet (LIN).

The vehicle state sensor 45 includes one or more sensors configured to detect operation states and behaviors of the vehicle 1 (hereinafter collectively referred to as "vehicle states"). The vehicle state sensor 45 includes one or more of a steering angle sensor, an accelerator position sensor, a brake stroke sensor, a brake pressure sensor, and an engine speed sensor, for example, and detects operation states of the vehicle 1 such as a steering angle of a steering wheel or steered wheels, an accelerator opening degree, a brake operation amount, and an engine speed. Moreover, the vehicle state sensor 45 includes one or more of a vehicle speed sensor, an acceleration sensor, and an angular velocity sensor, for example, and detects behaviors of the vehicle 1 such as a vehicle speed, a longitudinal acceleration, a lateral acceleration, and a yaw rate. The vehicle state sensor 45 transmits a sensor signal including detected information to the control device 50.

In the first embodiment, the vehicle state sensor 45 at least includes the accelerator position sensor, the brake stroke sensor, and the vehicle speed sensor. The accelerator position sensor detects an operation amount of an accelerator pedal by a driver. For example, the accelerator position sensor may be a sensor configured to detect a rotation amount of a rotary shaft of the accelerator pedal. However, this is not to be construed in a limiting sense. The brake stroke sensor detects an operation amount of a brake pedal by the driver. The brake stroke sensor may be a sensor configured to detect a movement amount of an output rod coupled to the brake pedal, or may be a sensor configured to detect a rotation amount of a rotary shaft of the brake pedal, or may be a sensor configured to detect a pressure on the brake pedal. However, this is not to be construed in a limiting sense. The vehicle speed sensor may be, for example, a sensor configured to detect a rotational speed of one of rotary shafts of the front-wheel drive motor 10F and the rear-wheel drive motor 10R, or a front-wheel drive shaft 5F, or a rear-wheel drive shaft 5R. However, this is not to be construed in a limiting sense.

Next, the configuration example of the motor drive system 2 according to the embodiment will be described.

Figure 2:
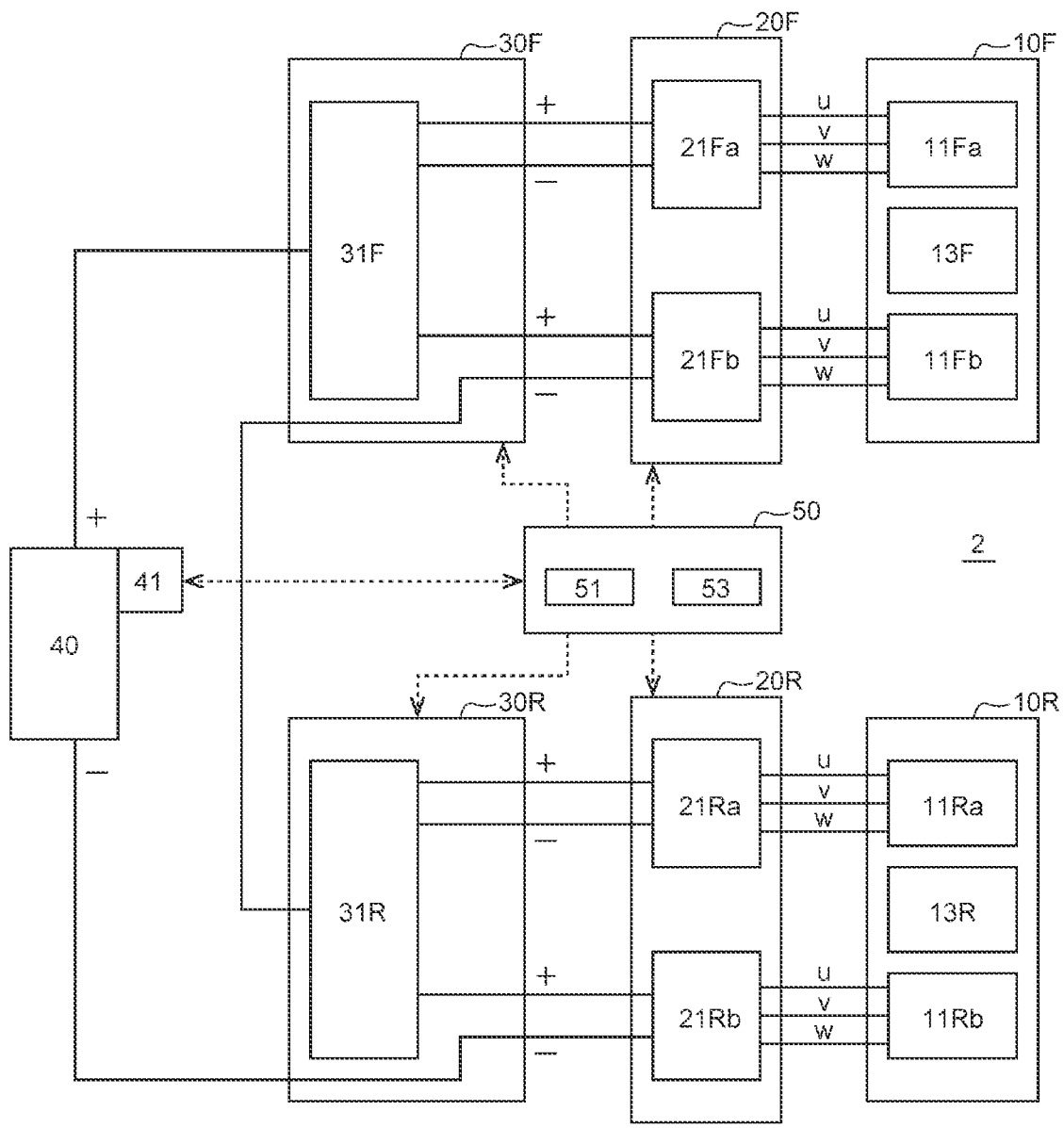
FIG. 2 is a block diagram illustrating a configuration example of the motor drive system according to the embodiment.
Figure 3:
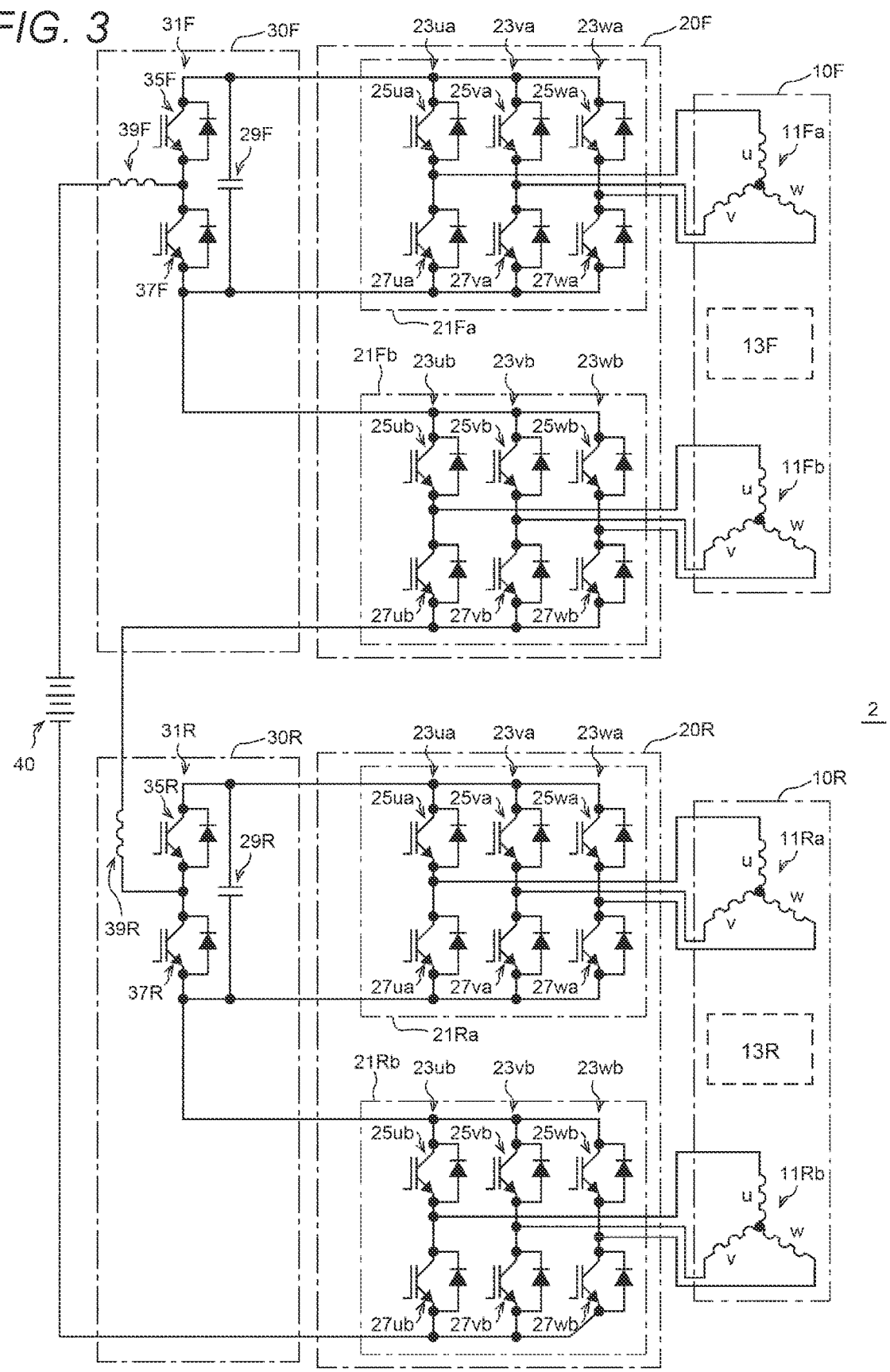
FIG. 3 is a circuit diagram illustrating the configuration example of the motor drive system according to the embodiment.

FIGS. 2 and 3 are diagrams illustrating the configuration of the motor drive system 2 according to the embodiment. FIG. 2 is a block diagram schematically illustrating the configuration of the motor drive system 2. FIG. 3 is a diagram illustrating a circuit configuration of the motor drive system 2.

As illustrated in FIG. 2, the motor drive system 2 includes the front-wheel drive motor 10F, the front-wheel inverter unit 20F, the front-wheel converter unit 30F, the rear-wheel drive motor 10R, the rear-wheel inverter unit 20R, the rear-wheel converter unit 30R, the battery 40, and the control device 50. The battery 40 is a secondary battery rechargeable and dischargeable. The battery 40 may be a lithium ion battery with a rated voltage of 200 V, for example. However, the battery 40 is not limited to particular rated voltages and kinds. The battery 40 is coupled to the front-wheel drive motor 10F via the front-wheel converter unit 30F and the front-wheel inverter unit 20F, and the battery 40 is coupled to the rear-wheel drive motor 10R via the rear-wheel converter unit 30R and the rear-wheel inverter unit 20R, so as to accumulate power supplied to the front-wheel drive motor 10F and the rear-wheel drive motor 10R. The battery 40 is provided with a battery management device 41 configured to detect data such as an open circuit voltage, an output voltage, and a battery temperature of the battery 40, and transmit the data to the control device 50.

The front-wheel drive motor 10F outputs the drive torque transmitted to the front wheels 3F via a front-wheel differential mechanism 7F and the front-wheel drive shaft 5F. The rear-wheel drive motor 10R outputs the drive torque transmitted to the rear wheels 3R via a rear-wheel differential mechanism 7R and the rear-wheel drive shaft 5R. Drive of the front-wheel drive motor 10F and the rear-wheel drive motor 10R is controlled by the control device 50. In the embodiment, the double-stator axial gap motors are used as the front-wheel drive motor 10F and the rear-wheel drive motor 10R. The double-stator axial gap motor has an axial gap structure where a rotor 13F, 13R is held between a first stator 11Fa, 11Ra and a second stator 11Fb, 11Rb spaced from each other and disposed on opposite sides of the rotor 13F, 13R in a rotary shaft direction thereof.

In the embodiment, the front-wheel drive motor 10F and the rear-wheel drive motor 10R are three-phase alternating current motors. However, the number of phases is not limited to a particular number. When a three-phase alternating current is supplied to each of the first stator 11Fa and the second stator 11Fb, rotary magnetic field is formed to rotate the rotor 13F so that the front-wheel drive motor 10F outputs the drive torque. While the three-phase alternating current is not supplied to the first stator 11Fa and the second stator 11Fb, the rotor 13F is rotated by receiving rotational torque of the front wheels 3F transmitted via the front-wheel drive shaft 5F so that the front-wheel drive motor 10F performs regenerative power generation. The rear-wheel drive motor 10R coupled to the rear wheels 3R similarly performs regenerative power generation.

The front-wheel inverter unit 20F includes a first inverter circuit 21Fa and a second inverter circuit 21Fb. The first inverter circuit 21Fa converts DC power provided from the battery 40 into three-phase AC power and supplies the three-phase AC power to the first stator 11Fa of the front-wheel drive motor 10F. The first inverter circuit 21Fa converts three-phase AC power regeneratively generated by the first stator 11Fa into DC power and supplies the DC power to the front-wheel converter unit 30F. Similarly, the second inverter circuit 21Fb converts DC power provided from the battery 40 into three-phase AC power and supplies the three-phase AC power to the second stator 11Fb of the front-wheel drive motor 10F. The second inverter circuit 21Fb converts three-phase AC power regeneratively generated by the second stator 11Fb into DC power and supplies the DC power to a step-up/step-down circuit 31F of the front-wheel converter unit 30F. Drive of the front-wheel inverter unit 20F is controlled by the control device 50. The rear-wheel inverter unit 20R coupled to the rear-wheel drive motor 10R has a similar function.

The front-wheel converter unit 30F includes the step-up/step-down circuit 31F. The step-up/step-down circuit 31F adjusts a voltage of power regeneratively generated by the first stator 11Fa of the front-wheel drive motor 10F and output from the first inverter circuit 21Fa, and supplies the power to the second inverter circuit 21Fb. The rear-wheel converter unit 30R includes a step-up/step-down circuit 31R. The step-up/step-down circuit 31R adjusts a voltage of power regeneratively generated by the first stator 11Ra of the rear-wheel drive motor 10R and output from the first inverter circuit 21Ra, and supplies the power to the battery 40. When supplying a current to the front-wheel inverter unit 20F and the rear-wheel inverter unit 20R, the step-up/step-down circuits 31F and 31R may boost the supplied current.

Drive of the front-wheel converter unit 30F and the rear-wheel converter unit 30R is controlled by the control device 50.

As illustrated in FIG. 3, the first inverter circuit 21Fa and the second inverter circuit 21Fb of the front-wheel inverter unit 20F each include switching elements. Operation of each of the switching elements of the first inverter circuit 21Fa and the second inverter circuit 21Fb is controlled by the control device 50. The first inverter circuit 21Fa and the second inverter circuit 21Fb have an identical configuration. The configuration of the first inverter circuit 21Fa will be described below whereas describing the configuration of the second inverter circuit 21Fb will be omitted as suited.

The first inverter circuit 21Fa includes three arm circuits 23ua, 23va, and 23wa (hereinafter generally referred to simply as "arm circuits 23a" unless specified otherwise). The arm circuit 23ua is electrically connected to a u-phase coil of the first stator 11Fa of the front-wheel drive motor 10F. The arm circuit 23va is electrically connected to a v-phase coil of the first stator 11Fa of the front-wheel drive motor 10F. The arm circuit 23wa is electrically connected to a w-phase coil of the first stator 11Fa of the front-wheel drive motor 10F. Each of the arm circuits 23a includes an upper arm at a current upstream side and a lower arm at a current downstream side.

The upper arm and the lower arm of each of the arm circuits 23a are provided with switching elements 25ua, 27ua, 25va, 27va, 25wa, and 27wa where diodes are electrically connected in an antiparallel manner. The switching elements 25ua, 27ua, 25va, 27va, 25wa, and 27wa may be, for example, metal oxide semiconductor field effect transistors (MOSFETs), insulated gate bipolar transistors (IGBTs), or other switching elements.

The u-phase, v-phase, and w-phase coils of the first stator 11Fa of the front-wheel drive motor 10F are each electrically connected to a connector between the upper arm and the lower arm of each of the arm circuits 23ua, 23va, and 23wa. Operation of the switching elements 25ua, 27ua, 25va, 27va, 25wa, and 27wa of the respective arm circuits 23ua, 23va, and 23wa is controlled by the control device 50 so that rotational drive of the rotor 13F by the first stator 11Fa of the front-wheel drive motor 10F and regenerative power generation by the first stator 11Fa are controlled.

The second inverter circuit 21Fb coupled to the second stator 11Fb of the front-wheel drive motor 10F has substantially the same configuration as the first inverter circuit 21Fa. However, the upper arm of the arm circuit 23a of the first inverter circuit 21Fa is electrically connected to an upper arm side of the step-up/step-down circuit 31F. The lower arm of the arm circuit 23a is electrically connected to a lower arm side of the step-up/step-down circuit 31F. The lower arm side of the step-up/step-down circuit 31F is electrically connected to the upper arm side of the arm circuit 23b of the second inverter circuit 21Fb. The upper arm of the arm circuit 23b of the second inverter circuit 21Fb is electrically connected to the lower arm side of the step-up/step-down circuit 31F. The lower arm of the arm circuit 23b is electrically connected to the step-up/step-down circuit 31R side of the rear-wheel converter unit 30R.

The step-up/step-down circuit 31F includes a coil 39F, two switching elements 35F and 37F, and a smoothing capacitor 29F. The step-up/step-down circuit 31F includes an upper arm electrically connected to an upper arm side of the first inverter circuit 21Fa, and a lower arm electrically connected to a lower arm side of the first inverter circuit 21Fa and the upper arm side of the arm circuit 23b of the second inverter circuit 21Fb. The upper arm and the lower arm are respectively provided with the switching elements 35F and 37F where diodes are electrically connected in an antiparallel manner. The switching elements 35F and 37F may be, for example, MOSFETs, IGBTs, or other switching elements. One end of the coil 39F is electrically connected to a positive electrode side of the battery 40, and the other end of the coil 39F is electrically connected between the two switching elements 35F and 37F. The smoothing capacitor 29F and the battery 40 are connected in parallel to each of the first inverter circuit 21Fa and the second inverter circuit 21Fb. Operation of each of the switching elements 35F and 37F is controlled by the control device 50.

The rear-wheel inverter unit 20R and the rear-wheel converter unit 30R coupled to the rear-wheel drive motor 10R have substantially the same configurations as the front-wheel inverter unit 20F and the front-wheel converter unit 30F. However, the step-up/step-down circuit 31R of the rear-wheel converter unit 30R is electrically connected to the lower arm side of the second inverter circuit 21Fb of the front-wheel inverter unit 20F. The lower arm of the step-up/step-down circuit 31R is electrically connected to the upper arm side of the arm circuit 23b of the second inverter circuit 21Rb. The lower arm side of the arm circuit 23b of the second inverter circuit 21Rb is electrically connected to a negative electrode side of the battery 40.

When controlling power running drive of the front-wheel drive motor 10F and the rear-wheel drive motor 10R, the control device 50 individually controls operation of switching elements of each of the step-up/step-down circuits 31F and 31R, boosts power of the battery 40, and supplies the power to the first inverter circuits 21Fa and 21Ra and the second inverter circuits 21Fb and 21Rb. Boosting ratios are adjusted by on/off duty ratios of the switching elements. The control device 50 individually controls operation of switching elements of each of the first inverter circuits 21Fa and 21Ra and the second inverter circuits 21Fb and 21Rb, and controls the supplied current to the first stators 11Fa and 11Ra and the second stators 11Fb and 11Rb of the front-wheel drive motor 10F and the rear-wheel drive motor 10R.

When controlling regenerative drive of the front-wheel drive motor 10F and the rear-wheel drive motor 10R, the control device 50 individually controls operation of switching elements of each of the first inverter circuits 21Fa and 21Ra and the second inverter circuits 21Fb and 21Rb, and adjusts regenerative power currents by the first stators 11Fa and 11Ra and the second stators 11Fb and 11Rb of the front-wheel drive motor 10F and the rear-wheel drive motor 10R. The control device 50 controls operation of the switching elements of each of the step-up/step-down circuits 31F and 31R, and adjusts the voltage in such a manner that a charging voltage of the battery 40 falls within a range of a requested charging voltage of the battery 40.

The motor drive system 2 according to the embodiment includes two double-stator axial gap motors as the front-wheel drive motor 10F and the rear-wheel drive motor 10R. The first inverter circuit 21Fa and the second inverter circuit 21Fb respectively connected to the first stator 11Fa and the second stator 11Fb of the front-wheel drive motor 10F are connected in series to the first inverter circuit 21Ra and the second inverter circuit 21Rb respectively connected to the first stator 11Ra and the second stator 11Rb of the rear-wheel drive motor 10R.

In the motor drive system 2 mounted on the vehicle 1 in the embodiment, when the battery 40 is charged with regeneratively generated power by each of the front-wheel drive motor 10F and the rear-wheel drive motor 10R, the charging voltage is to be adjusted to fall within the range of the requested charging voltage of the battery 40. In the motor drive system 2, the sum of the regenerative power voltages output from the first inverter circuits 21Fa and 21Ra and the second inverter circuits 21Fb and 21Rb is the charging voltage of the battery 40.

The motor drive system 2 includes the front-wheel drive motor 10F and the rear-wheel drive motor 10R, and when a deceleration torque at the front wheel side increases during deceleration, a regenerative torque of the front-wheel drive motor 10F often becomes larger than a regenerative torque of the rear-wheel drive motor 10R. When a regenerative torque changes under a predetermined regenerative power voltage, the regenerative torque is proportional to a regenerative power current. For example, during deceleration of the vehicle 1, when the front-wheel drive motor 10F and the rear-wheel drive motor 10R have substantially the same rotational speed, the regenerative power voltages of the first stators 11Fa and 11Ra and the second stators 11Fb and 11Rb are the same. Consequently, a difference of the regenerative torques appears as a difference of the regenerative power currents of the first stators 11Fa and 11Ra and the second stators 11Fb and 11Rb.

At this time, as the sum of the regenerative power currents of the first stators 11Fa and 11Ra and the second stators 11Fb and 11Rb is larger, regenerative power efficiency becomes higher. That is, in the motor drive system 2, the sum of the regenerative power voltages of the front-wheel drive motor 10F and the rear-wheel drive motor 10R is to be within the range of the requested charging voltage of the battery 40, and the sum of the regenerative power currents of the front-wheel drive motor 10F and the rear-wheel drive motor 10R is to be increased.

In view of this, in the motor drive system 2 according to the embodiment, the step-up/step-down circuits 31F and 31R are respectively provided for the front-wheel drive motor 10F and the rear-wheel drive motor 10R, and the step-up/step-down circuits 31F and 31R are respectively connected to the first inverter circuits 21Fa and 21Ra from a group consisting of the first inverter circuits 21Fa and 21Ra and the second inverter circuits 21Fb and 21Rb. Thus, while the charging voltage of the battery 40 is adjusted using the two step-up/step-down circuits 31F and 31R, a ratio of the regenerative power current by the first stators 11Fa and 11Ra and the regenerative power current by the second stators 11Fb and 11Rb of the front-wheel drive motor 10F and the rear-wheel drive motor 10R can be adjusted to increase the sum of the regenerative power currents by the front-wheel drive motor 10F and the rear-wheel drive motor 10R. Concerning each of the front-wheel drive motor 10F and the rear-wheel drive motor 10R, this ratio depends on a ratio of an output current of the first inverter circuit 21Fa (21Ra) where the step-up/step-down circuit 31F (31R) is connected, with respect to the regenerative power current.

Hereinafter, a description will be given on a configuration of the control device 50 configured to perform a control process of the motor drive system 2 according to the embodiment. This will be followed by a detailed description on processing in the case of regenerative drive of the front-wheel drive motor 10F and the rear-wheel drive motor 10R, which is a feature of the motor drive system 2.

The control device 50 controls operation of the motor drive system 2 by one or more processors such as a central processing unit (CPU) executing a computer program. This computer program causes the processors to perform the operation, described later, to be performed by the control device 50. The computer program to be executed by the processors may be recorded on a recording medium serving as a storage (memory) 53 of the control device 50, or may be recorded on a recording medium incorporated in the control device 50 or any recording medium externally attachable to the control device 50.

The recording medium where the computer program is recorded may be a magnetic medium such as a hard disk, a floppy disk, and a magnetic tape, an optical recording medium such as a compact disk read only memory (CD-ROM), a digital versatile disk (DVD), and a Blu-ray (trademark) disk, a magnetic, optical medium such as a floptical disk, a storage element such as a random access memory (RAM) and a read only memory (ROM), a flash memory such as a universal serial bus (USB) memory and a solid state drive (SSD), and any other medium where the program is storable.

As illustrated in FIG. 2, the control device 50 includes a processor unit 51 and the storage 53. The processor unit 51 includes one or more processors such as a central processing unit (CPU). For example, the processor unit 51 may be partly or wholly configured with firmware or other updatable matter, or a program module executed by commands from the processors. However, the processor unit 51 may be partly or wholly configured with hardware.

The storage 53 includes one or more storage elements (memories), such as a RAM and a ROM, connected to the processor unit 51 in a communicable manner. However, the number and kind of storages 53 is not limited to any particular number and kind. The storage 53 stores computer programs executed by the processor unit 51, and data used for arithmetic processing such as various parameters, detection data, and arithmetic processing results. In addition, the control device 50 includes an interface configured to communicate with the battery management device 41 and the vehicle state sensor 45, for example.

The processor unit 51 controls drive of the first inverter circuits 21Fa and 21Ra, the second inverter circuits 21Fb and 21Rb, and the step-up/step-down circuits 31F and 31R so as to control power running drive of the front-wheel drive motor 10F and the rear-wheel drive motor 10R. In one example, the processor unit 51 obtains information of a target acceleration of the vehicle 1. When the target acceleration is a positive value, the processor unit 51 calculates target drive torques of the front-wheel drive motor 10F and the rear-wheel drive motor 10R based on information of a vehicle speed and the target acceleration. The processor unit 51 controls drive of each of the switching elements disposed in the first inverter circuits 21Fa and 21Ra, the second inverter circuits 21Fb and 21Rb, and the step-up/step-down circuits 31F and 31R based on the target drive torque calculated, so as to drive the front-wheel drive motor 10F and the rear-wheel drive motor 10R. Thus, the front-wheel drive motor 10F and the rear-wheel drive motor 10R output the drive torque of the vehicle 1.

When the target acceleration is a negative value, the processor unit 51 calculates target regenerative torques of the front-wheel drive motor 10F and the rear-wheel drive motor 10R based on information of the vehicle speed and the target acceleration. The processor unit 51 controls drive of each of the switching elements disposed in the first inverter circuits 21Fa and 21Ra, the second inverter circuits 21Fb and 21Rb, and the step-up/step-down circuits 31F and 31R based on the target regenerative torques calculated, so as to control regenerative drive of the front-wheel drive motor 10F and the rear-wheel drive motor 10R. Thus, the front-wheel drive motor 10F and the rear-wheel drive motor 10R perform regenerative power generation and generate regenerative brake torques. Details of a control process by the processor unit 51 will be described below.

Figure 4:
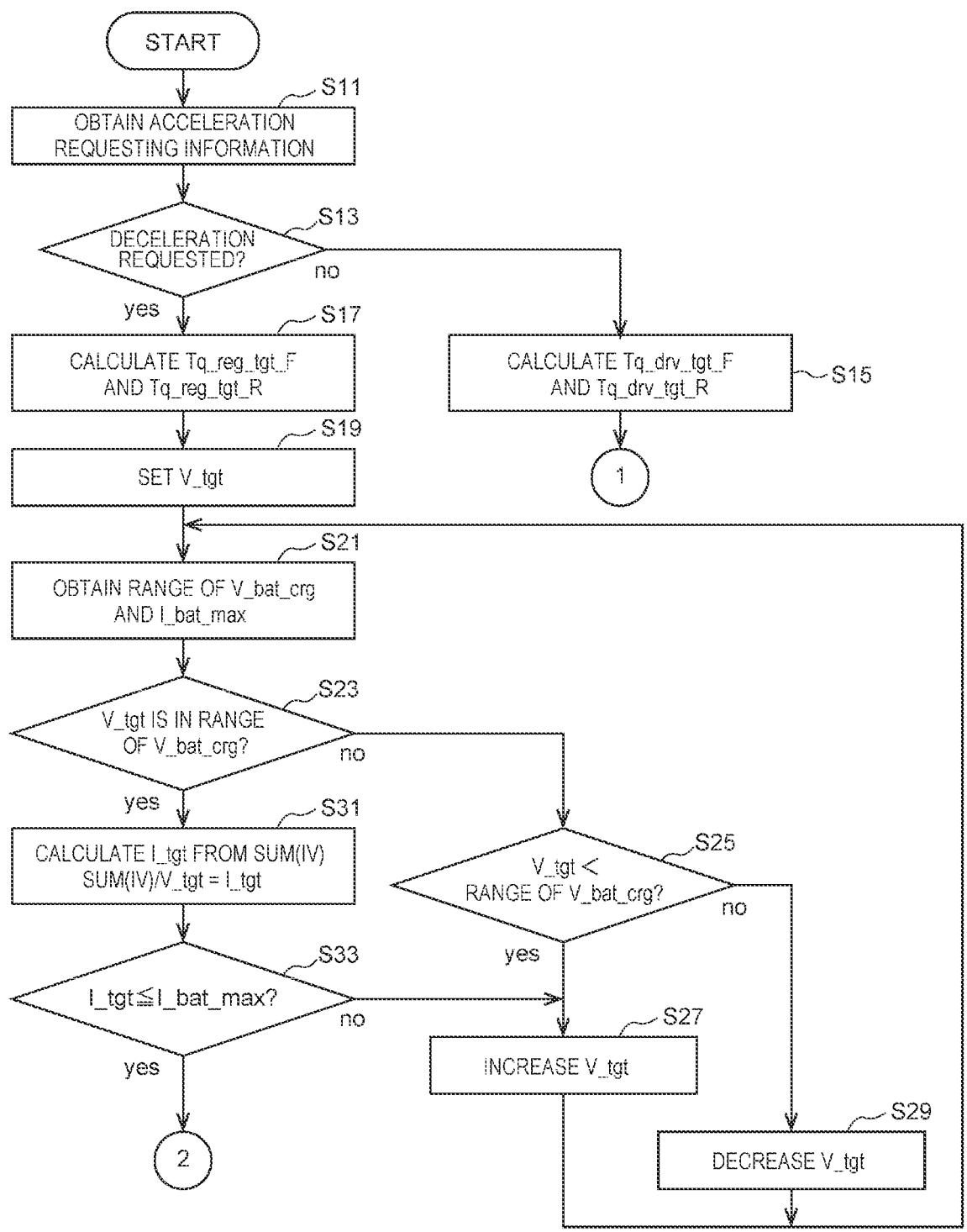
FIG. 4 is a flowchart of an operation example of the motor drive system according to the embodiment.
Figure 5:
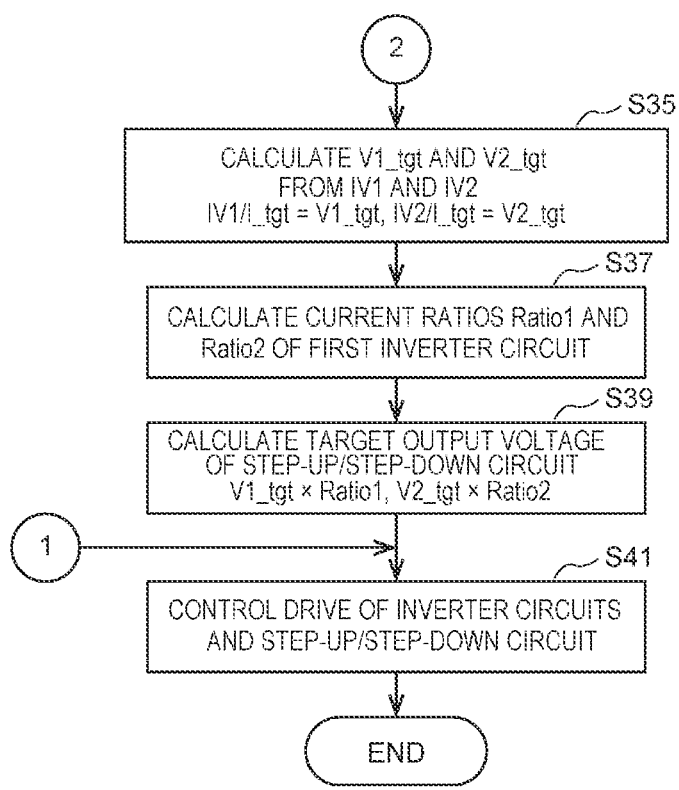
FIG. 5 is a flowchart of the operation example of the motor drive system according to the embodiment.

FIGS. 4 and 5 are flowcharts of an example of processing operation by the control device 50 of the motor drive system 2 according to the embodiment. The processing operation illustrated in the flowcharts of FIGS. 4 and 5 is repeated in a predetermined processing cycle.

First, the processor unit 51 obtains acceleration requesting information of the vehicle 1 (step S11). The acceleration requesting information is detectable based on sensor signals from the accelerator position sensor and the brake stroke sensor, for example. When the accelerator pedal is depressed, the processor unit 51 determines that the driver is requesting acceleration. When the brake pedal is depressed or when a speed of the accelerator pedal returning in a direction where the operation amount of the accelerator pedal becomes zero exceeds a predetermined threshold, the processor unit 51 determines that the driver is requesting deceleration. It is noted that when the vehicle 1 is traveling in a self-driving mode, the processor unit 51 obtains, as the acceleration requesting information, information of a requested acceleration or a requested deceleration calculated by arithmetic processing.

Next, based on the acceleration requesting information obtained, the processor unit 51 determines whether deceleration of the vehicle 1 is being requested (step S13). Unless it is determined that deceleration is being requested (No at S13), the processor unit 51 calculates target drive torques Tq_drv_tgt_F and Tq_drv_tgt_R respectively output from the front-wheel drive motor 10F and the rear-wheel drive motor 10R based on information of the vehicle speed and the target acceleration (step S15). The information of the vehicle speed is obtainable based on a sensor signal transmitted from the vehicle speed sensor. The information of the target acceleration is obtainable based on a sensor signal transmitted from the accelerator position sensor. When acceleration is being requested, a target acceleration is a positive value. The target drive torques Tq_drv_tgt_F and Tq_drv_tgt_R are larger values as the vehicle speed is higher and as the target acceleration is higher. It is noted that the target drive torque Tq_drv_tgt_F of the front-wheel drive motor 10F and the target drive torque Tq_drv_tgt_R of the rear-wheel drive motor 10R may be the same or may be different.

Next, based on the target drive torques Tq_drv_tgt_F and Tq_drv_tgt_R calculated, the processor unit 51 controls drive of each of the switching elements of the step-up/step-down circuits 31F and 31R, the first inverter circuits 21Fa and 21Ra, and the second inverter circuits 21Fb and 21Rb so as to control power running drive of the front-wheel drive motor 10F and the rear-wheel drive motor 10R (step S41). Control processes of power running drive of the front-wheel drive motor 10F and the rear-wheel drive motor 10R are performed basically by the same procedure. The front-wheel drive motor 10F will now be taken as an example, and the control process of power running drive of the front-wheel drive motor 10F will be briefly described.

For example, based on the target drive torque Tq_drv_tgt_F of the front-wheel drive motor 10F and the rotational speed of the front-wheel drive motor 10F, the processor unit 51 sets voltages of direct current supplied to the first inverter circuit 21Fa and the second inverter circuit 21Fb, and frequencies of three-phase alternating current supplied to the first stator 11Fa and the second stator 11Fb of the front-wheel drive motor 10F. Although a ratio of a drive torque Tq_drv_tgt_F1 of the first stator 11Fa and a drive torque Tq_drv_tgt_F2 of the second stator 11Fb is basically 1:1, the ratio of drive torques may be set as suited. However, when the ratio of drive torques is 1:1, the voltage of direct current supplied to the first inverter circuit 21Fa can be made equal to the voltage of direct current supplied to the second inverter circuit 21Fb, and drive amounts of the switching elements 25*a* and 27*a* of the first inverter circuit 21Fa can be made equal to drive amounts of the switching elements 25*b* and 27*b* of the second inverter circuit 21Fb, thereby reducing a load of the control process.

Based on a ratio of the output voltage of the battery 40 and a voltage of direct current supplied to the first inverter circuit 21Fa and the second inverter circuit 21Fb, the processor unit 51 controls drive of the switching elements 35F and 37F of the step-up/step-down circuit 31F and raises a voltage of direct current output from the battery 40 to a preset voltage. The processor unit 51 controls drive of each of the switching elements of the first inverter circuit 21Fa and the second inverter circuit 21Fb, converts direct current into three-phase alternating current, and supplies the three-phase alternating current to the first stator 11Fa and the second stator 11Fb. Thus, the front-wheel drive motor 10F is driven to output the drive torque of the vehicle 1. It is noted that arithmetic processing in the case of power running drive of the front-wheel drive motor 10F and the rear-wheel drive motor 10R is not limited to any particular processing but may be performed by a known arithmetic processing method.

At step S13 above, when it is determined that deceleration is being requested (Yes at S13), the processor unit 51 calculates target regenerative torques Tq_reg_tgt_F and Tq_reg_tgt_R of the front-wheel drive motor 10F and the rear-wheel drive motor 10R based on information of the vehicle speed and the target acceleration (step S17). When deceleration is being requested, a target acceleration is a negative value. The target regenerative torques Tq_reg_tgt_F and Tq_reg_tgt_R are larger values as the vehicle speed is higher and as the target acceleration is lower (higher on a negative side). It is noted that an upper limit may be set for the target regenerative torques Tq_reg_tgt_F and Tq_reg_tgt_R settable, and that information of a brake torque insufficient for deceleration requesting may be transmitted to the brake hydraulic pressure control device 19 of the hydraulic brake system 16 so that the insufficient brake torque may be compensated with a hydraulic brake torque.

Next, the processor unit 51 sets a target value (regeneration target voltage) V_tgt of the sum of the regenerative power voltages output from the first inverter circuits 21Fa and 21Ra and the second inverter circuits 21Fb and 21Rb (step S19). At this step, the processor unit 51 sets the regeneration target voltage V_tgt supposing that the rotational speed of the front-wheel drive motor 10F and the rotational speed of the rear-wheel drive motor 10R are the same during deceleration of the vehicle 1. That is, the processor unit 51 sets the regeneration target voltage V_tgt supposing that the regenerative power voltages V_inv of the first inverter circuits 21Fa and 21Ra and the second inverter circuits 21Fb and 21Rb are the same value.

Generally, an induction power generation voltage E by electromagnetic induction of a motor including a stator and a rotor may be represented by the following formula 1:

Formula 1

$$E = -\frac{d\Phi}{dt} = B \times S \times \omega \times \sin\theta \quad (1)$$

$\Phi$: magnetic flux
t: time
B: magnetic flux density
S: coil area
$\omega$: rotor angular velocity
$\theta$: angle made by a direction parallel to a coil surface of the stator and a perpendicular to a direction of the magnetic flux density That is, the regenerative power voltage V_inv by each of the first inverter circuits 21Fa and 21Ra and the second inverter circuits 21Fb and 21Rb is proportional to the rotational speeds of the front-wheel drive motor 10F and the rear-wheel drive motor 10R, namely, the vehicle speed. Since the magnetic flux density (B) and the coil area(S) in the above formula 1 are information obtainable from a specification of the front-wheel drive motor 10F and the rear-wheel drive motor 10R in advance, the processor unit 51 is capable of calculating the regenerative power voltage V_inv of the first inverter circuits 21Fa and 21Ra and the second inverter circuits 21Fb and 21Rb based on the vehicle speed. The processor unit 51 quadruples the calculated regenerative power voltage V_inv so as to obtain the regeneration target voltage V_tgt.

It is noted that sensors, for example, configured to detect the rotational speeds of the front-wheel drive motor 10F and the rear-wheel drive motor 10R are provided, the processor unit 51 may calculate the regenerative power voltage V_inv of the first inverter circuits 21Fa and 21Ra and the second inverter circuits 21Fb and 21Rb not based on the vehicle speed but based on the rotational speeds of the front-wheel drive motor 10F and the rear-wheel drive motor 10R. The rotational speed of each of the motors may be detected by a sensor configured to detect a rotational speed of a motor shaft or may be calculated based on a rotational speed of the drive shaft of the wheels detected by a sensor configured to detect the rotational speed of the drive shaft.

Next, the processor unit 51 obtains information of a requested charging voltage V_bat_crg of the battery 40 and information of a charging maximum current value I_bat_max (step S21). The information of the requested charging voltage V_bat_crg of the battery 40 and the information of the charging maximum current value I_bat_max are preset in accordance with a specification of the battery 40 and stored in the storage 53. For example, as an open circuit voltage of the battery 40 is higher, a range of the requested charging voltage V_bat_crg is set at a higher voltage side, and the charging maximum current value I_bat_max is set at a smaller value. Meanwhile, as the open circuit voltage of the battery 40 is lower, the range of the requested charging voltage V_bat_crg is set at a lower voltage side, and the charging maximum current value I_bat_max is set at a larger value.

Next, the processor unit 51 determines whether the regeneration target voltage V_tgt calculated at step S19 is in the range of the requested charging voltage V_bat_crg of the battery 40 (step S23). Since the regenerative power voltage V_inv is proportional to the vehicle speed, as described above, the regeneration target voltage V_tgt at a low vehicle speed often becomes lower than the range of the requested charging voltage V_bat_crg of the battery 40, and the regeneration target voltage V_tgt at a high vehicle speed becomes higher than the range of the requested charging voltage V_bat_crg of the battery 40 in other cases.

Unless the regeneration target voltage V_tgt is in the range of the requested charging voltage V_bat_crg of the battery 40 (No at S23), the processor unit 51 determines whether the regeneration target voltage V_tgt is lower than the range of the requested charging voltage V_bat_crg of the battery 40 (step S25). When the regeneration target voltage V_tgt is lower than the range of the requested charging voltage V_bat_crg of the battery 40 (Yes at S25), the processor unit 51 increases the regeneration target voltage V_tgt (step S27). The processor unit 51 may increase the regeneration target voltage V_tgt gradually by a predetermined value, and may set an increase width of the regeneration target voltage V_tgt based on a difference between the regeneration target voltage V_tgt and the range of the requested charging voltage V_bat_crg of the battery 40.

Unless the regeneration target voltage V_tgt is lower than the range of the requested charging voltage V_bat_crg of the battery 40 (No at S25), that is, when the regeneration target voltage V_tgt exceeds the range of the requested charging voltage V_bat_crg of the battery 40, the processor unit 51 decreases the regeneration target voltage V_tgt (step S29). The processor unit 51 may decrease the regeneration target voltage V_tgt gradually by a predetermined value, and may set a decrease width of the regeneration target voltage V_tgt based on a difference between the regeneration target voltage V_tgt and the range of the requested charging voltage V_bat_crg of the battery 40.

After performing the processing at step S27 or step S29, the processor unit 51 returns to step S21 and repeats determining whether the regeneration target voltage V_tgt is in the range of the requested charging voltage V_bat_crg of the battery 40. At step S25 to step S29, in order to make the regeneration target voltage V_tgt fall within the range of the requested charging voltage V_bat_crg of the battery 40, processing of adjusting the regeneration target voltage V_tgt is performed.

At step S23, when the regeneration target voltage V_tgt is in the range of the requested charging voltage V_bat_crg of the battery 40 (Yes at S23), the processor unit 51 calculates a target current value (charging target current value) I_tgt of power with which to charge the battery 40, from the sum SUM (IV) of a regeneratively generated power amount IV1 of the front-wheel drive motor 10F and a regeneratively generated power amount IV2 of the rear-wheel drive motor 10R (step S31). The regeneratively generated power amount IV1 of the front-wheel drive motor 10F and the regeneratively generated power amount IV2 of the rear-wheel drive motor 10R can be calculated based on the target regenerative torques Tq_reg_tgt_F and Tq_reg_tgt_R of the motors. The charging target current value I_tgt can be calculated by dividing the sum SUM (IV) of the regeneratively generated power amount IV1 of the front-wheel drive motor 10F and the regeneratively generated power amount IV2 of the rear-wheel drive motor 10R by the regeneration target voltage V_tgt.

Next, the processor unit 51 determines whether the charging target current value I_tgt calculated is equal to or less than the charging maximum current value I_bat_max of the battery 40 (step S33). When the charging target current value I_tgt exceeds the charging maximum current value I_bat_max of the battery 40 (Yes at S33), the processor unit 51 increases the regeneration target voltage V_tgt so as to decrease the charging target current value I_tgt (step S27). After increasing the regeneration target voltage V_tgt, the processor unit 51 returns to step S21 again and performs the processing at each of the steps described so far.

When the charging target current value I_tgt is equal to or less than the charging maximum current value I_bat_max of the battery 40 (Yes at S33), the processor unit 51 calculates regeneration target voltages V1_tgt and V2_tgt of the respective motors from the regeneratively generated power amount IV1 of the front-wheel drive motor 10F and the regeneratively generated power amount IV2 of the rear-wheel drive motor 10R (step S35). That is, the processor unit 51 calculates the regeneration target voltages V1_tgt and V2_tgt of the motors when a value of current with which to charge the battery 40 is the charging target current value I_tgt. In one example, the processor unit 51 divides the regeneratively generated power amount IV1 of the front-wheel drive motor 10F by the charging target current value I_tgt so as to calculate the regeneration target voltage V1_tgt of the front-wheel drive motor 10F. Similarly, the processor unit 51 divides the regeneratively generated power amount IV2 of the rear-wheel drive motor 10R by the charging target current value I_tgt so as to calculate the regeneration target voltage V2_tgt of the rear-wheel drive motor 10R.

Next, the processor unit 51 calculates ratios of current Ratio1 and Ratio2 output from the first inverter circuits 21Fa and 21Ra where the step-up/step-down circuits 31F and 31R are respectively connected, from among the first inverter circuits 21Fa and 21Ra and the second inverter circuits 21Fb and 21Rb respectively connected to the front-wheel drive motor 10F and the rear-wheel drive motor 10R (step S37). At this step, the current ratios Ratio1 and Ratio2 on the first inverter circuits 21Fa and 21Ra side are set so that currents output from the first inverter circuits 21Fa and 21Ra having the regenerative power voltages adjusted by the respective step-up/step-down circuits 31F and 31R have the charging target current value I_tgt, and currents output from the second inverter circuits 21Fb and 21Rb where voltage adjustment is not performed have the charging target current value I_tgt. In one example, the processor unit 51 calculates the ratios of current Ratio1 and Ratio2 output from the first inverter circuits 21Fa and 21Ra using the following formulae 2 and 3:

$$Ratio1 = 1 - (V\_inv / V1\_tgt) \qquad 2$$

$$Ratio2 = 1 - (V\_inv / V2\_tgt) \qquad 3$$

It is noted that "V_inv" represents the regenerative power voltage of the first inverter circuits 21Fa and 21Ra and is calculated from the vehicle speed or the rotational speed of each of the motors (see Formula 1 above).

Next, the processor unit 51 calculates target output voltages V1_con_tgt and V2_con_tgt of the step-up/step-down circuits 31F and 31R connected to the first inverter circuits 21Fa and 21Ra of the front-wheel drive motor 10F and the rear-wheel drive motor 10R (step S39). In one example, the processor unit 51 multiplies the regeneration target voltage V1_tgt of the front-wheel drive motor 10F by the current ratio Ratio1 on the first inverter circuit 21Fa side so as to calculate the target output voltage V1_con_tgt of the step-up/step-down circuit 31F. Similarly, the processor unit 51 multiplies the regeneration target voltage V2_tgt of the rear-wheel drive motor 10R by the current ratio Ratio2 on the first inverter circuit 21Ra side so as to calculate the target output voltage V2_con_tgt of the step-up/step-down circuit 31R.

Next, based on the target regenerative torques Tq_reg_tgt_F and Tq_reg_tgt_R of the motors, the current ratios Ratio1 and Ratio2, and the target output voltages V1_con_tgt and V2_con_tgt of the step-up/step-down circuits 31F and 31R, the processor unit 51 controls drive of each of the switching elements of the step-up/step-down circuits 31F and 31R, the first inverter circuits 21Fa and 21Ra, and the second inverter circuits 21Fb and 21Rb so as to cause the front-wheel drive motor 10F and the rear-wheel drive motor 10R to perform regenerative power generation (step S41).

In one example, the processor unit 51 multiplies the target regenerative torque Tq_reg_tgt_F of the front-wheel drive motor 10F by the current ratio Ratio1 so as to calculate a target regenerative torque of the first stator 11Fa. The processor unit 51 subtracts the target regenerative torque of the first stator 11Fa from the target regenerative torque Tq_reg_tgt_F of the front-wheel drive motor 10F so as to calculate a target regenerative torque of the second stator 11Fb. Based on the respective target regenerative torques of the first stator 11Fa and the second stator 11Fb, and the rotational speed of the front-wheel drive motor 10F, the processor unit 51 sets the on/off frequency of each of the switching elements of the first inverter circuit 21Fa and the second inverter circuit 21Fb. Furthermore, the processor unit 51 sets an on/off drive duty ratio of the switching elements of the step-up/step-down circuit 31F based on a ratio of the target output voltage V1_con_tgt of the step-up/step-down circuit 31F and the requested charging voltage V_bat_crg.

Concerning the rear-wheel drive motor 10R as well, the processor unit 51 sets an on/off drive duty ratio of each of the switching elements of the first inverter circuit 21Ra, the second inverter circuit 21Rb, and the step-up/step-down circuit 31R. Then, the processor unit 51 controls drive of each of the switching elements of the first inverter circuits 21Fa and 21Ra, the second inverter circuits 21Fb and 21Rb, and the step-up/step-down circuits 31F and 31R. Thus, three-phase AC regenerative power currents output from the first stators 11Fa and 11Ra and the second stators 11Fb and 11Rb of the front-wheel drive motor 10F and the rear-wheel drive motor 10R are converted into direct current, and the charging voltage of the battery 40 is raised to the requested charging voltage so as to charge the battery 40.

As described above, when deceleration of the vehicle 1 is requested, the control device 50 individually controls the first inverter circuits 21Fa and 21Ra, the second inverter circuits 21Fb and 21Rb, and the step-up/step-down circuits 31F and 31R so that the regenerative power currents by the inverter circuits are made equal to each other, and that the charging voltage of the battery 40 is adjusted to the requested charging voltage. In the motor drive system 2, the step-up/step-down circuits 31F and 31R are respectively disposed on the first inverter circuits 21Fa and 21Ra side connected to the first stators 11Fa and 11Ra of the front-wheel drive motor 10F and the rear-wheel drive motor 10R. Consequently, without decreasing the regenerative power efficiency on the second inverter circuits 21Fb and 21Rb side, the regenerative power currents by the inverter circuits can be made equal to each other, and the charging voltage of the battery 40 can be adjusted to the requested charging voltage. Therefore, when the regeneratively generated power by the front-wheel drive motor 10F and the rear-wheel drive motor 10R connected in series is boosted by the step-up/step-down circuits 31F and 31R so as to charge the battery 40, regenerative power efficiency can be prevented from decreasing.

The embodiments of the disclosure have been described heretofore with reference to the accompanying drawings. However, the disclosure is not limited to such embodiments. It will be apparent to those normally skilled in the art where the disclosure pertains that various changes and modifications to the embodiments can be conceived within the technical scope of the appended claims, and it is to be understood that such changes and modifications also naturally belong to the technical scope of the disclosure.

For example, the vehicle 1 where the technique according to the embodiment of the disclosure is applicable is not limited to the electric vehicle including the front-wheel drive motor 10F and the rear-wheel drive motor 10R. For example, the vehicle 1 may be an electric vehicle including a single axial gap drive motor provided for each of the wheels. In such an electric vehicle, even when torque vectoring control is performed to make different target regenerative torques of the drive motors, regenerative drive can be controlled in the same manner as described above with the step-up/step-down circuits being connected to the first inverter circuit side from among the first inverter circuit and the second inverter circuit connected to the first stator and the second stator of each of the drive motors.

In the above-described embodiment, the motor drive system applied to the electric vehicle is given as an example. However, the motor drive system according to the embodiment of the disclosure is not limited to the motor drive system for the electric vehicle but may be a motor drive system for a railroad or the like.

The invention claimed is:

1. A motor drive system comprising:
   a battery;
   double-stator axial gap motors;
   inverter circuits configured to control power running drive and regenerative drive of the double-stator axial gap motors;
   step-up/step-down circuits configured to adjust at least voltage of regeneratively generated power of the double-stator axial gap motors; and
   one or more control devices configured to control drive of the inverter circuits and the step-up/step-down circuits,
   wherein each of the double-stator axial gap motors comprises two stators,
   wherein each of the inverter circuits are connected to a respective one of the two stators,
   wherein the inverter circuits are connected in series,
   wherein a single step-up/step-down circuit among the step-up/step-down circuits is provided for each of the axial gap motors,
   wherein the single step-up/step-down circuit provided for each of the axial gap motors is connected to one of two inverter circuits connected to the two stators among the inverter circuits, and
   wherein the one or more control devices are configured to, during the regenerative drive of the double-stator axial gap motors, adjust an output voltage from the one of the two inverter circuits by controlling the drive of the step-up/step-down circuits to make regenerative power currents of the two inverter circuits of each of the double-stator axial gap motors equal to each other, and supply a current from the one of the two inverter circuits to another of the two inverter circuits.

2. The motor drive system according to claim 1, wherein the motor drive system is a motor drive system for a vehicle, and
   wherein the one or more control devices are configured to
   during the regenerative drive of the double-stator axial gap motors, set a charging target current of the battery based on: a sum of regeneratively generated powers of all of the double-stator axial gap motors calculated based on a requested deceleration of the vehicle; a requested charging voltage of the battery; and a charging maximum current of the battery,
   calculate a regeneration target voltage of each of the double-stator axial gap motors based on the regeneratively generated power and the charging target current, and
   set a target output voltage of the step-up/step-down circuit based on the regeneration target voltage and a ratio of an output current of the one of the two inverter circuits to which the single step-up/step-down circuit is connected, with respect to the regenerative power current of each of the double-stator axial gap motors.

3. A motor drive system comprising:

a battery;

double-stator axial gap motors;

inverter circuits configured to control power running drive and regenerative drive of the double-stator axial gap motors;

step-up/step-down circuits configured to adjust at least voltage of regeneratively generated power of the double-stator axial gap motors; and one or more control devices configured to control drive of the inverter circuits and the step-up/step-down circuits, wherein each of the double-stator axial gap motors comprises two stators, wherein each of the inverter circuits are connected to a respective one of the two stators, wherein the inverter circuits are connected in series, wherein a single step-up/step-down circuit among the step-up/step-down circuits is provided for each of the axial gap motors, wherein the single step-up/step-down circuit provided for each of the axial gap motors is connected to one of two inverter circuits connected to the two stators among the inverter circuits, and wherein the one or more control devices are configured to, during the regenerative drive of the double-stator axial gap motors, adjust an output voltage from the one of the two inverter circuits by controlling the drive of the step-up/step-down circuits to make regenerative power currents of the two inverter circuits of each of the double-stator axial gap motors equal to each other.

* * * * *